Feb. 21, 1933.  W. A. MEDLIN  1,898,200

FISH LURE

Filed July 3, 1931

INVENTOR:
W. A. Medlin
BY
ATTORNEY

Patented Feb. 21, 1933

1,898,200

UNITED STATES PATENT OFFICE

WENZEL A. MEDLIN, OF CLEVELAND, OHIO

FISH LURE

Application filed July 3, 1931. Serial No. 548,488.

The invention relates to fish lures and, in its broader aspects, is applicable to lures simulating various types or forms of live bait. The principal object of the invention is to provide a lure which, when attached to a line and played through the water, or subjected to the action of a water current, will move in a manner closely resembling the movements of a live specimen which the lure simulates.

A further object of the invention is the provision of an improved form of spoon-type lure which, in addition to the characteristic above noted, possesses the further advantage of simplicity of construction and adaptability for use in weedy water with a minimum tendency to snagging.

Another object of the invention is the provision of a spoon lure of improved form having a novel arrangement of the fish hooks attached thereto.

With the foregoing objects in view, as well as others more or less incidental or ancillary to those mentioned, the invention consists in certain structural combinations and arrangements which will be set forth in the following description and claims.

In the accompanying drawing.

Figure 1:
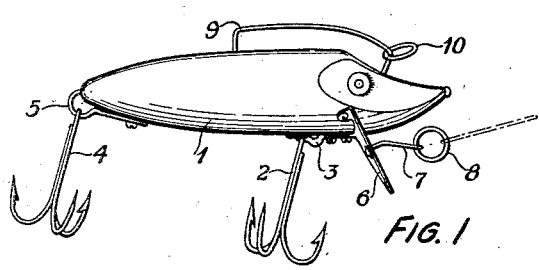
Figs. 1 and 2 are a side and a front elevation, respectively, of a "plug" type of lure embodying my improvements.
Figure 2:
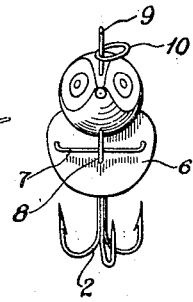
Figure 3:
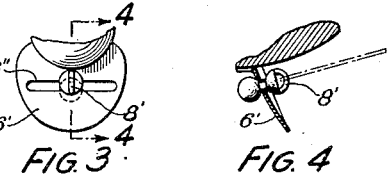
Fig. 3 and 4 are fragmentary views in front elevation and vertical section, respectively, showing a modification of the lure shown in Figs. 1 and 2.

Referring in detail to the constructions illustrated in the drawing, and first to the form of device shown in Figs. 1, 2 and 3, 1 designates the body part of a lure of the "plug" or minnow type which carries on its under side a group of fish hooks 2 secured to the body of the lure in well known manner by a clip 3. The lure also carries at its rear or tail end a second group of hooks 4 which are secured by a clip 5. At its front end the body of the lure is fitted with a downwardly and forwardly projecting fin or plate 6 designed to present to the water an inclined surface of considerable area.

The features of construction so far described are such as are well known and in common use. Heretofore a lure of this character has been provided at or near its front end with a fixed ring or eye to receive the fish line, the latter thus having a fixed point of attachment to the lure. As distinguished from this, in carrying out my invention, I secure to the fin 6 an elongated transversely extending wire loop 7 on which is loosely and slidably mounted a small ring 8 to which the fish line is intended to be secured.

The lure is also provided on its upper side with an elongated, longitudinally extending wire loop 9 on which is loosely and slidably mounted a ring 10 to which the fish line may alternatively be attached.

In the use of the lure, assuming that the fish line is attached to the ring 8, it will be seen that when the lure is played through the water by the fisherman by drawing upon the fish line intermittently in different directions, the ring 8, because of its loose fit on the loop 7, is permitted to slide on the latter, thus in effect varying the point of attachment of the line to the lure, with the result that the lure may be caused to move in the water in different directions with sudden, darting movements which are characteristic of a live minnow.

By attaching the fish line to the ring 10 on the loop 9 instead of to the ring 8 a somewhat different darting movement of the lure in the water can be produced by the fisherman, the sliding of the ring 10 on the loop 9 causing changes in the effective point of attachment of the line with corresponding sudden changes in the direction of movement of the lure.

Figure 4:
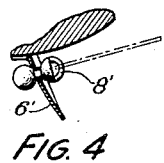

In Figs. 3 and 4 I have illustrated a more or less obvious equivalent method of attaching the fish line to the fin or plate 6 of the lure shown in Figs. 1 and 2. Here the plate or fin 6' is formed with a transverse slot 6'' in which is loosely and slidably mounted a member 8' formed at its front end with an eye to which the fish line can be secured. The sliding movement of the eye member in the slot 6'' obviously will have the same general effect as the movement of the ring 8 on the loop 7 in the first described construction.

Figure 5:
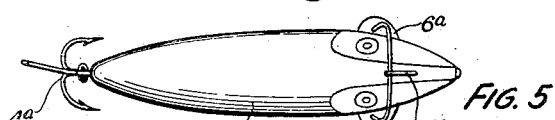
Fig. 5 is a plan view and Figs. 6 and 7 are, respectively, a side elevation and a front elevation of a modified form of the "plug" lure.
Figure 6:
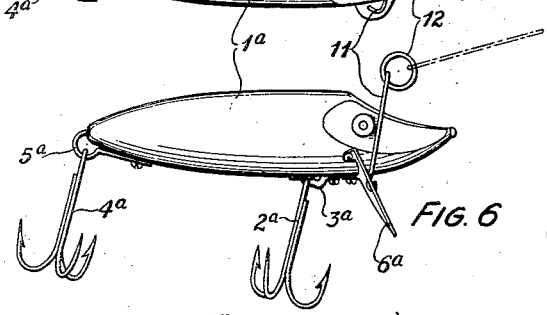
Figure 7:
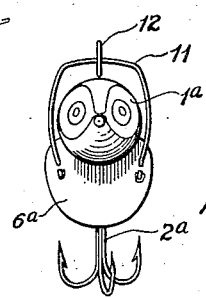

In the modified form of lure shown in Figs. 5, 6 and 7, the construction of the body part 1a, the hooks 2a, 4a, the hook attaching means 3a and 5a and the inclined plate or fin 6a is similar to that of the corresponding parts of the first described lure. In this second construction, however, the means of attaching the line comprises an upstanding loop 11, the legs of which rise at either side of the body of the lure and the transverse part of which extends over the body of the lure. On this loop 11 is loosely and slidably mounted an attaching ring 12.

In the use of this second form of lure it will be seen that, as in the first form of construction, the ring is free to slide on the loop and consequently that as the lure is played through the water by the fisherman the ring will take different positions on the loop, thus changing the effective point of attachment of the line to the lure with resultant darting movements of the lure in different directions.

Figure 8:
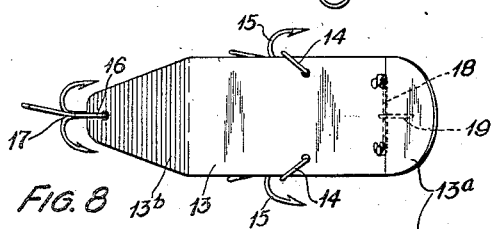
Fig. 8 is a plan view and Figs. 9 and 10 are, respectively, a side elevation and a front elevation of a spoon-type lure embodying my improvements.
Figure 9:
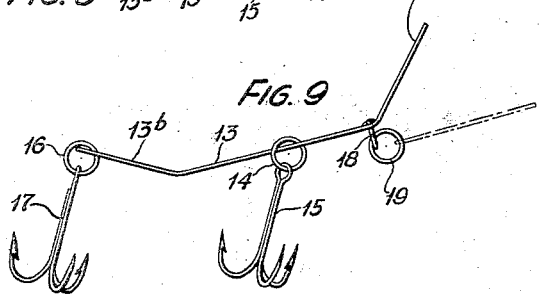
Figure 10:
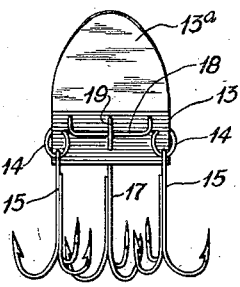

The spoon-type of lure shown in Figs. 8, 9, and 10 comprises an elongated body part 13 formed from flat sheet metal and having a front end section 13a bent upward at a rather sharp angle to the main portion of the body and its rear end portion 13b also bent upward but preferably at a lesser angle than in the case of the front end 13a. The main, straight portion of the body 13 is formed at either side with perforations to receive rings 14, 14 which serve as attaching means for groups of hooks 15, 15. The rear end 13b is also perforated to receive an attaching ring 16 for a group of hooks 17. In the region of the bend or angle between the front part 13a and the middle, main part of the body 13 an elongated transversely arranged wire loop 18 is rigidly secured to the lure and on this loop is mounted an attaching ring 19 for the fish line.

In the operation of this last described lure, the effect of the upwardly inclined front end 13a under the draft of the fish line, serves to sustain the lure in the water or to cause it to rise in the water, according to the velocity of its movement, and as the lure is played by the fisherman by intermittent drafts on the line in varying directions the line attaching ring 19 is free to slide on the loop 18 and the lure is thus given lateral, darting movements of the same general character as those described in connection with the "plug" or minnow type of lure. My improved spoon lure, because of the adequate lifting power secured by the upwardly inclined front end, can be made relatively wide and thus it becomes feasible to attach hooks at the opposite sides of the spoon in addition to the hooks at the rear end of the spoon. An extremely effective lure is thus secured.

Figure 11:
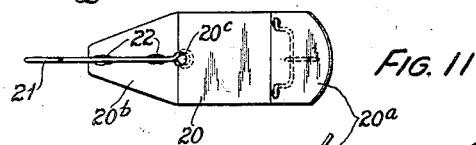
Fig. 11 is a plan view and Figs. 12 and 13 are, respectively, a side elevation and a front elevation of another form of spoon lure embodying my improvements.
Figure 12:
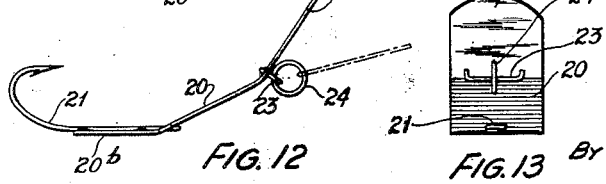
Figure 13:
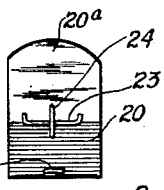

In Figs. 11, 12 and 13 I have shown another form of spoon lure embodying certain of my improvements. In this case the main body part 20 of the lure is formed from flat sheet metal and, as in the spoon just described, has its front end 20a bent upward at an angle to the intermediate portion of the plate. The rear end 20b is also bent upward but at a lesser angle than the front part 20a. The plate is formed with a perforation at 20c on the longitudinal axis of the lure at the bend between the rear part 20b and the intermediate part of the plate. This perforation is of a size to permit insertion of the barbed end of the fish hook but to prevent passage of the eye end of the hook. The hook when thus inserted is then secured to the rear end part 20b in the position indicated in any suitable manner, as by soldering at 22, 22. Adjacent the bend between the front part 20a and the intermediate part of the spoon the latter is provided with a transversely extending wire loop 23 on which is loosely and slidably mounted a ring 24 to which the fish line may be attached.

This last described spoon in use functions in much the same manner as the spoon first described as will be apparent without further description. It is to be noted, however, that this second spoon, because of the form of the main body part and the arrangement of the fish hook 21, is especially well adapted for use in weedy water. Obviously the spoon is well adapted to slide over underlying weeds or obstructions without snagging the hook.

It will be apparent from the foregoing description that all of the various forms of lure illustrated and described embody the distinctive feature which may be briefly characterized as the movable point of line attachment. It will be apparent that in its broadest aspect the loop, slot or other means for providing the movable point of attachment for the line can be applied to the body of the lure in a great variety of positions other than those illustrated and still secure the effective characteristic of the movable or sliding point of attachment. For example, while in the case of the attaching loops illustrated the transverse portion of the loop in each instance is disposed in a vertical plane at right angles to the longitudinal axis of the lure, it is obvious that the transverse portion of the loop or slot may extend at any other angle to said longitudinal axis. It will also be observed that, in the case of the loop 7 in Fig. 1 and the loop 11 in Fig. 6, the attaching rings are free to slide not only on the transverse portion of the loop but also on the side branches thereof, thus affording a great variety of effects corresponding to the various positions of the line attaching ring on the loop. While I do not limit my invention to any particular relative arrangement of the attaching loop or slot, I prefer an arrangement such that the effective point of attachment for the line shall be at a point more or less to the rear of the front end of the main body part of the lure. This, of course, is especially important in the case of the spoon types of lure illustrated in which cases the lifting action incident to the upwardly inclined front portions of the lure is particularly effective because the point of attachment is to the rear of the front end of the body of the lure. Furthermore, in the case of all of the various types of lures the arrangement of the loop, slot or other attaching means to the rear of the front end of the lure insures the securing of a turning or pivotal movement of the lure about an axis well back of the front end or tip of the lure, thus securing the quick turning and darting movement of the lure which is characteristic of the live minnow.

From what has been said it will be apparent that my improvements can be embodied in a great variety of forms and that the invention is not limited to the particular forms illustrated except as is indicated by the definitions in the appended claims.

What I claim is:

1. In a fish lure, the combination of a body part, and means for connecting a line to said body part constructed and arranged to permit the point of attachment of the line to move a substantial amount in relation to the body of the lure and thereby cause the draught of the line to move the lure in a different direction as the said point of attachment changes.

2. In a fish lure, the combination of a body part, and means for connecting a line to the said body part constructed and arranged to permit the point of attachment of the line to move a substantial amount in relation to the body of the lure in a direction transverse to the longitudinal axis of the lure body and thereby cause the draught of the line to move the lure in a different direction as the said point of attachment changes.

3. In a fish lure, the combination of a body part, and means for connecting a line to the lure comprising a wire loop rigidly secured to the body part and a ring arranged slidably thereon, the said loop being disposed transversely of the longitudinal axis of the body part of the lure, whereby the draught of the line will cause the lure to move in different directions as the said ring slides on the loop.

4. In a fish lure, the combination of an elongated plate-like body part having a portion thereof at its front end bent upward in relation to the longitudinal axis of said body part, and means to the rear of the front end of the lure for attaching a line thereto, said means being adapted to permit the point of attachment of the line to move transversely of the longitudinal axis of the lure.

5. In a fish lure, the combination of an elongated plate-like body part having a portion thereof at its front end bent upward at an angle to the longitudinal axis of the body part, and means in the region of the bend of the body part for attaching a line to the lure, said means being adapted to permit the point of attachment of the line to move transversely of the longitudinal axis of the plate-like body part.

6. In a fish lure, the combination of an elongated plate-like body part having portions at the front and rear ends thereof bent upward relative to its longitudinal axis, and means for attaching a line to the lure disposed to the rear of the front end thereof, said means being adapted to permit the point of attachment of the line to move transversely of the longitudinal axis of the lure.

7. In a fish lure, the combination of an elongated plate-like body part having a portion thereof at its front end bent upward in relation to the longitudinal axis of said body part, means disposed at each of the longitudinal side edges of the lure for attachment of one or more fish hooks thereto, and means disposed to the rear of the front end of the lure for attaching a line thereto, said means being adapted to permit the point of attachment of the line to move transversely of the longitudinal axis of the lure.

8. In a fish lure, the combination of an elongated plate-like body part having portions at the front and rear ends thereof bent upward in relation to the longitudinal axis of the lure, a single fish hook rigidly secured to the lure with its shank disposed against and parallel to the rear end portion of the lure and with its sharp end extending upward in relation to the body of the lure, and means disposed to the rear of the front end of the lure for attaching a line thereto, said means being adapted to permit the point of attachment of the line to move transversely of the longitudinal axis of the lure.

In testimony whereof, I hereunto affix my signature.

WENZEL A. MEDLIN.